United States Patent [19]

Gartshore et al.

[11] 4,197,217

[45] Apr. 8, 1980

[54] INTERMETALLIC CATALYST

[75] Inventors: Anthony Gartshore, Reading; Ian R. McGill, Thatcham; Allin S. Pratt, Wallingford; Eric Shutt, Benson, all of England

[73] Assignee: Johnson, Matthey & Co., Limited, London, England

[21] Appl. No.: 930,014

[22] Filed: Aug. 1, 1978

[30] Foreign Application Priority Data

Aug. 5, 1977 [GB] United Kingdom ............... 32920/77

[51] Int. Cl.$^2$ ......................... B01J 21/04; B01J 23/42; B01J 23/74
[52] U.S. Cl. ................................ 252/466 J; 252/432; 252/443; 252/447; 252/455 R; 252/457; 252/459; 252/462; 252/464; 252/465; 252/466 PT; 252/466 B; 252/470; 252/472; 252/473; 252/474; 252/477 R; 423/213.5; 423/403
[58] Field of Search ......... 252/462, 464, 465, 466 PT, 252/466 B, 470, 447, 472, 477 R, 432, 443, 455 R, 457, 459, 466 J, 473, 474; 75/172 R; 204/43 N; 423/213.5, 403; 427/252, 319, 405, 436

[56] References Cited

U.S. PATENT DOCUMENTS

| 1,978,198 | 10/1934 | Handforth | 423/403 |
|---|---|---|---|
| 2,145,651 | 1/1939 | Funk | 75/172 R |
| 3,424,619 | 1/1969 | Adlhart et al. | 75/172 R |
| 3,840,471 | 10/1974 | Acres | 423/213.5 X |
| 3,920,583 | 11/1975 | Pugh | 423/213.5 |
| 3,944,504 | 3/1976 | Ford et al. | 423/213.5 X |
| 3,979,273 | 9/1976 | Panzera et al. | 427/405 X |
| 3,999,956 | 12/1976 | Stueber et al. | 427/252 X |

FOREIGN PATENT DOCUMENTS 1238013 7/1971 United Kingdom ................. 75/172 R

*Primary Examiner*—W. J. Shine
*Attorney, Agent, or Firm*—Cushman, Darby & Cushman

[57] ABSTRACT

This invention relates to catalysts suitable for the catalytic oxidation of hydrocarbons and carbon monoxide and for the catalytic reduction of oxides of nitrogen in the presence, respectively, of suitable oxidizing and reducing means. The invention is especially concerned with catalysts which are suitable for the catalytic purification or control of the exhaust gases of petrol driven internal combustion engines and of diesel engines. Such catalysts have been variously described as "three-way", "polyfunctional" and "multi-functional" catalysts. In more detail a three way catalyst of the invention comprises a substrate having supported thereon at least one intermetallic compound of the general formula $A_xB_y$ where A represents one or more Groups VIII metals having an atomic number not larger than 78; B represents one or more metals of the group consisting of Al, Sc, Y, the lanthanides, Ti, Zr, Hf, V, Nb and Ta and x and y are integers.

14 Claims, 1 Drawing Figure

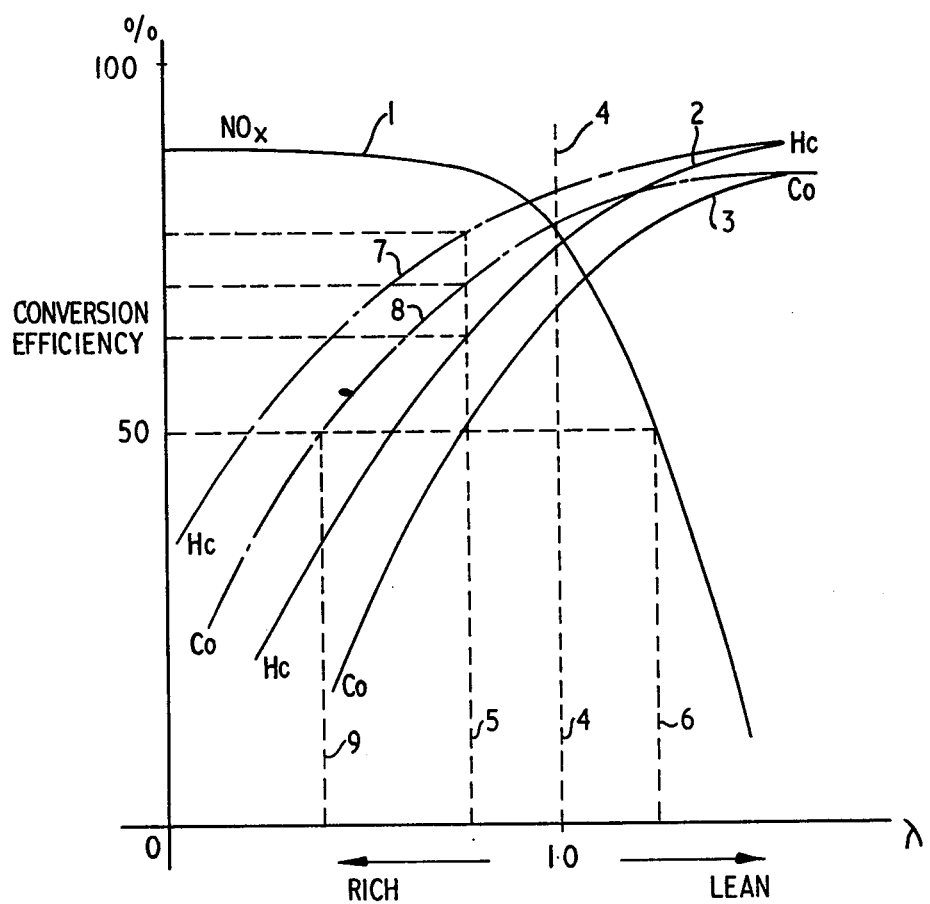

INTERMETALLIC CATALYST

This invention relates to catalysts. More particularly, the invention is concerned with catalysts suitable for the catalytic oxidation of hydrocarbons and carbon monoxide and for the catalytic reduction of oxides of nitrogen in the presence, respectively, of suitable oxidising and reducing means.

Although it is by no means so limited, the invention is especially concerned with catalysts of the type just described which are suitable for the catalytic purification or control of the exhaust gases of petrol driven internal combustion engines and of diesel engines. Such catalysts have been variously described as "three way", "polyfunctional" and "multi-functional" catalysts.

In this specification catalysts of the type just referred to will generally be described as "three way catalysts" or as "three-way catalysts as herein defined". Further the words "gas" and "gases" are, as the context requires, to be taken as meaning a gas or gases per se, a vapour or vapours or a mixture of mixtures containing one or more gases and one or more vapours. Thus, the word "gas" when used in the expression "exhaust gas" means the mixture of gases and vapours (and also of some liquid droplets) which issues, for example, from a petrol driven internal combustion engine when the engine is running.

The components of exhaust gases of petrol driven internal combustion engines and of diesel engines may generally be divided into two groups. The first group contains components which are, or will act as reducing agents and can hence be oxidised and the second, components which are or will act as oxidising agents and can hence be reduced. By "purification" or "control" of exhaust gases in this specification is meant the oxidation of at least a proportion of any components of the said first group and the reduction of at least a proportion of any components of the said second group so as to form one or more of at least the products water, carbon dioxide, nitrogen and hydrogen.

Typical members of the first group are carbon monoxide and hydrocarbons formed by the incomplete combustion of fuel in the engine, hydrocarbons in the shape of unburnt but vapourised fuel and hydrogen gas. The principal members of the second group are oxides of nitrogen, often referred to collectively as "$NO_x$", oxygen and water vapour which latter component may be reduced to hydrogen.

Ideally the components of the first and second groups would be in stoichiometric balance in a stream of exhaust gas so that by passing such an exhaust stream over a suitable catalyst, the said components could be caused to interact and to effect mutual oxidation and reduction with the formation, for example, of carbon dioxide, water and nitrogen and without leaving any residual unreacted gas or gases. Such a stoichiometric balance normally only occurs momentarily in practice, and generally there are periods when components of the first (the oxidisable) group preponderate and other periods when those of the second (the reducible) group are in excess.

The performance of a catalyst with respect firstly to the oxidation of carbon monoxide and hydrocarbons and secondly to the reduction of $NO_x$ in exhaust gas is conveniently (and commonly) represented graphically as in the attached FIG. 1 in which the percentage conversion efficiency of a catalyst for each of the three exhaust gas constituents just referred to is plotted against "$\lambda$" (lamda) values for the engine producing the exhaust gas. The $\lambda$ value is the ratio of the actual to the stoichiometric air/fuel ratio. It follows that $\lambda$ has the value 1 when the air/fuel ratio is stoichiometric. By "air/fuel ratio" is means the ratio of air to fuel supplied to the engine via the carburettor or fuel injection system and, by "stoichiometric air fuel ratio" is meant that ratio of air to fuel in which there is just sufficient air to supply the required quantity of oxygen for all the fuel present to be burnt. Not all the fuel is, of course, completely burnt in an engine, even under the most favourable conditions, and it is for this reason that hydrocarbons and carbon monoxide and unused oxygen appear in the exhaust gas. The $NO_x$ on the other hand is formed by the combination of nitrogen and oxygen from the air under conditions of high temperature and pressure in the cylinders of the engine.

Turning now to FIG. 1, lines 1, 2 and 3 represent the changes in conversion efficiency for $NO_x$, hydrocarbons and carbon monoxide respectively with changes in the value of $\lambda$ for a typical prior art rhodium/platinum on alumina three way catalyst in the exhaust train of a motor car. Such a catalyst is covered by our British Patent No. 1,390,182.

Typical reactions which are promoted by the catalyst may be represented by:

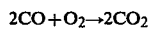  (1)

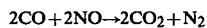  (2)

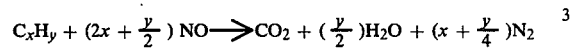  (3)

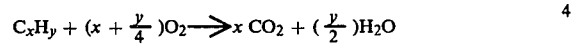  (4)

The unit value of $\lambda$ in FIG. 1, corresponding to a stoichiometric air/fuel ratio is represented by the broken line 4. Whilst the engine is running there are excursions of the air/fuel ratio on the "rich" and "lean" sides of the $\lambda = 1$ line corresponding to reductions in the value of $\lambda$ below 1 and increases above this value. If the catalyst is to operate effectively as a three way catalyst it is evident from FIG. 1 that $\lambda$ cannot be allowed to fall much below the value represented by the broken line 5 nor much above the value represented by the broken line 6. At the lower value of $\lambda$ in FIG. 1 (line 5) the conversion efficiency for CO has been reduced to 50% and at the upper value (line 6) the conversion efficiency for $NO_x$ has also been reduced to 50%.

The range of $\lambda$ values represented by the lines 5 and 6 within which the catalyst system is required to operate in order to give acceptable values of minimum conversion efficiency, is often called the "$\lambda$-window" (lambda-window). In practice, in order to provide the necessary tight control of the air/fuel ratio so as to keep within the $\lambda$-window, it is necessary to provide a device in the exhaust train upstream of the catalyst to monitor the proportion of oxygen in the exhaust gas and to use a signal from this device (often called an "oxygen sensor") to control a fuel injection unit. In this way it is possible to keep the air/fuel ratio within acceptable and prescribed limits. It is not normally possible to exercise the required control of the ratio of air to fuel when these are fed to an engine via a carburettor.

The advent of the three-way catalyst was a considerable advance in the field of pollution control technology, at least in so far as it applies to the control of the exhaust gases from petrol driven internal combustion engines and diesel engines. Thus, it made redundant the two-stage catalytic reduction and oxidation system which was hitherto necessary. At a stroke, therefore, it halved the number of catalyst units required for each engine. It did, however, bring with it certain difficulties, chief among them being the need to control the λ-values to within fairly tight limits during the operation of the engine with which the catalyst is associated.

An object of the present invention is accordingly to provide a three-way catalyst which does not suffer from the disadvantages just described to the same extent as known three-way catalysts.

We have achieved this object by "opening" the λ-window with respect to the oxidisable components of the exhaust gas. That is, we have invented a catalyst which will promote the oxidation of at least carbon monoxide and hydrocarbons at lower values of λ than has hitherto been possible. The result is indicated in general terms by the chain lines 7 and 8 in FIG. 1 and from this it will be seen that the lower limit of λ is reduced from the value represented by the broken line 5 to the value represented by the broken line 9.

The new catalyst does this by making use of the water vapour, which is present in the exhaust gas, for the purposes of oxidation in reactions represented by:

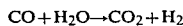

$$CO + H_2O \rightarrow CO_2 + H_2 \quad \quad 5$$

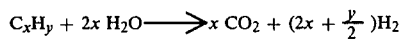

$$C_xH_y + 2x\,H_2O \longrightarrow x\,CO_2 + (2x + \frac{y}{2})H_2 \quad \quad 6$$

Reaction 5 is often called "the water gas shift reaction".

According to the invention, a three-way catalyst as herein defined comprises one or more intermetallic compounds of the general formula $A_xB_y$ where A represents one or more Group VIII metals having an atomic number not larger than 78; B represents one or more metals from the group consisting of Al, Sc, Y, the lanthanides, Ti, Zr, Hf, V, Nb, and Ta and x and y are integers, the said intermetallic compound or compounds being supported on a substrate.

The substrate may be of metal or a ceramic material and is preferably provided with a layer containing at least one refractory metal oxide, the intermetallic compound or compounds being supported on this oxide layer.

Many compounds of the type $A_xB_y$ are miscible with one another and structures in which the surface coatings are deposited upon the refractory metal oxide containing layer contain more than one compound of the type $A_xB_y$ are included within the scope of this invention.

Intermetallic compounds which have been found to be particularly suitable for the purpose of this invention are $Ni_3Al$ and $Ni_{2.86}Pt_{0.14}Al$ especially when supported on a metal or ceramic substrate provided with a layer or "washcoat" containing $Al_2O_3$.

A number of different techniques may be employed to produce a coating in the form of a thin film of the intermetallic compound upon the surface of the oxide coated substrate. For example, aluminium may be deposited onto the surface of a nickel, or platinum nickel impregnated oxide by a pack-aluminising process. In this process the substrate carrying the impregnated oxide layer is placed in a heat-resistant container in an appropriate mixture of chemicals such that aluminium is transferred via the vapour phase onto the oxide surface. At the aluminising temperature, typically 800°–1000° C., interaction occurs between the aluminium and the metal or metals with which the oxide layer is impregnated to give the required intermetallic compound.

Alternatively, chemical vapour deposition from an appropriate compound or electrodeposition either from an aqueous or fused salt electrolyte may be used to give the requisite compound upon interaction with the metal or metals with which the oxide-containing layer is impregnated.

Whichever method is adopted the objective is to form a layer which is preferably, but not essentially firmly adherent, of intermetallic compound upon the oxide coated substrate.

In another technique the metals forming the intermetallic compound are prepared as an appropriate solution in water or an organic solvent. In this technique the compound is caused to form a deposit on the oxide coated substrate by the addition of a reducing agent. The substrate is placed in the solution whilst the precipitation is taking place and becomes coated with a uniform, microcrystalline layer of the intermetallic compound.

In yet another method, the oxide coated substrate is firstly impregnated with a mixed aqueous solution of reducible salts of the metals which will form the intermetallic compound; secondly it is dried and then finally it is heated in a stream of pure hydrogen at high temperature. For the formation of $Ni_3Al$, for example, a solution of stoichiometric quantities of nickel and aluminium chlorides is used and for $Ni_{2.86}Pt_{0.14}Al$, an appropriate proportion of the nickel chloride is replaced by chlorplatinic acid.

The ceramic supports may be either of the particulate type, for example pellets, or they may be monolithic. Monolithic ceramic supports are preferably of the "honeycomb" type having a regular array of gas flow channels. Suitable materials which may be used to constitute the ceramic support are zircon-mullite, mullite, alpha alumina, sillimanite, magnesium silicates, kaolin clays, zircon, petalite, spodumene, cordierite and most alumino-silicates.

Proprietary products which may be used are described in Talsma U.S. Pat. No. 3,397,154, Stiles U.S. Pat. No. 3,498,927 and Corning British Patent No. 882,484. Examples are "Torvex" (Registered Trade Mark) which is a mullite honeycomb having eight corrugations per inch and bearing an alumina washcoat; "Thermacomb" (Registered Trade Mark), a cordierite honeycomb supplied by the American Lava Corporation and EX 20 a cordierite honeycomb supplied by Corning Glass.

Suitable supports of the pelleted type are of porous silica, such as, for example that sold under the trade mark "Silocel"; granular charcoal; alpha or gamma alumina granules or pellets; naturally occurring or synthetic alumino silicates; magnesia, diatomaceous earth, bauxite, titania, zirconia, limestone, magnesium silicate, silicon carbide, activated and in-activated carbons. The above materials may be in the form of regularly or irregularly shaped particles such as capillary tubes, extrudates, rods, balls, broken pieces or tiles, etc.

Preferably, the ceramic particulate support or honeycomb structure has deposited thereon a first coating of a refractory metal oxide which is furhter impregnated or coated with one or more of the intermetallic compounds mentioned above. Suitable refractory metal oxides comprising the said first coating are one or more of the oxides of B, Al, Si, Be, Mg, Ca, Sr, Ba, Sc, Y, Ti, Zr, Hf, Th, the lanthanides and the actinides. Preferred refractory metal oxide layers comprise members of the gamma or activated alumina family. These can be prepared, for example, by precipitating a hydrous alumina gel and, thereafter, drying and calcining to expel hydrated water and provide active gamma alumina. A particularly preferred active refractory metal oxide is obtained by drying and calcining at temperatures of 400° to 800° C. a precursor mixture of hydrous alumina phases predominating in crystalline trihydrate, that is, containing in excess of 50 percent by weight of the total alumina hydrate composition, preferably from 65 to 95 percent by weight of one or more of the trihydrate forms of gibbsite, bayerite and nonstrandite by X-ray diffraction. We prefer to use British Aluminium Co grade MH170 alumina hydrate and convert it to activated alumina by drying and firing as described above.

The film must be of sufficient thickness to provide adequate absorbtive capacity for retaining the catalytically active intermetallic compound containing one or more of the specified group VIII metals. The film is preferably from 0.0004 to 0.002 inches thick.

There are many different techniques for the preparation of a high surface area catalytically active refractory metal oxide wash coat containing one or more of the refractory metal oxides which confer beneficial properties as regards ageing and inertness to deposited catalytic intermetallic compounds at high temperature under oxidising and reducing conditions.

It is preferred that the surface area of the alumina shall be 50–500 square meters per gram of alumina.

An alternative preferred method for the deposition of an adherent alumina washcoat on the ceramic substrate is to prepare a slurry of a pre-activated Gibbsite (alumina trihydrate) and an alumina monohydrate having a solid liquid ratio of between 25 and 50% and a pH less than 7 and using this to impregnate the shaped substrate by complete immersion. The exact strength of the slurry used (which may be determined by trial and error) should be sufficient to produce an alumina washcoat of the required thickness. The substrate is then allowed to dry in warm air and finally fired for 2 hours at 450° C. to form chi- and gamma-alumina in adherent coating up to 0.002 in. thick on the metallic substrate. Crystal aggregates of diameter 3–7 microns are produced having micropores of approximately the same size, i.e., 40 Å in diameter.

A further method of deposition of an adherent alumina washcoat on the ceramic substrate includes the use of a slurry of alpha-alumina monohydrate. After firing at 450° C. gamma-alumina is formed having a surface area between 180 and 300 square meters per gram. Gamma-alumina is added to alpha-alumina monohydrate at the slurrying stage before firing in order to form a thixotropic mixture. Crystallite or crystal aggregates of 20–100 Å diameter are formed. Micropore diameters remain the same at 40 Å.

Another method is to precipitate the hydrous alumina from an alkali metal aluminate solution containing excess aluminium and alkali metal hydroxide directly on to the ceramic substrates forming part of the present invention. If the aluminate solution is maintained at a temperature of 60°–85° C. a film or coating of alpha-alumina trihydrate (Gibbsite) is deposited. Subsequent heating at 250°–180° C. converts the tri-hydrate to the monohydrate and subsequent heating at 540° C. converts the monohydrate to gamma alumina without loss of the very high surface area coating which is produced by this method. The high surface area results from the formation of hexagonal crystal aggregates of approximate size 8×8×20 microns. Micropores of size 40 Å diameter are present in the hexagonal crystal aggregates but appear to play no part in the catalytic activity of the structure.

Suitable proprietary alumina trihydrates (Gibbsite) are "FRF 80" supplied by British Aluminium Chemicals Ltd and "C 333" supplied by Conoco. Suitable alumina monohydrates (Boehmite) are "Sol-Gel Alumina" supplied by the United Kingdom Atomic Energy Authority. "Dispal M" supplied by Conoco and "Condea F" supplied by the Condea Group. Gibbsite is added to "Sol-Gel Alumina" (which is microcrystalline Boehmite) at the slurrying stage in order to form a thixotropic mixture.

Optionally one or more of the oxides titania, zirconia, hafnia and thoria may be present in the alumina for the purpose of providing additional stabilisation of the intermediate oxide (washcoat) layer. Other rare earth oxides, alkaline earth oxides and alkai metal oxides may also be used.

As previously indicated, the substrate may be in the form of a metallic honeycomb monolith. As supports, metallic honeycomb monoliths show much lower pressure drops than the ceramic type and also possess 1½–3 times the surface to volume ratio of a ceramic honeycomb monolith. The normal ceramic honeycomb monolith substrate has a surface to volume ratio of the order of 600–700 sq.ft. per cubic foot of substrate. Examples are proprietary products EX20 (Corning) which has a surface area of 576 sq.ft./ft.$^3$ and Grace 400 in which the surface area is 780 sq.ft./ft.$^3$. This is the highest obtained so far and should be compared with 1100 sq.ft./ft.$^3$ for 0.003" thick Kanthal D sheet and 2000 sq.ft./ft.$^3$ for 0.002" thick Kanthal D sheet.

The substrate is conveniently made from corrugated foil or from alternate layers of corrugated and uncorrugated foil of thickness between 0.0015 and 0.0045 inch (and preferably of thickness 0.002 inch) which is assembled to form a structure having approximately 400 cells per square inch when considered in cross section. A preferred range of cell sizes is 200–800 cells per square inch. Suitable surface to volume ratios are 1200 sq.ft. per cubic foot with 400 cells per square inch and 2000 sq.ft. per cubic foot with 800 cells per square inch.

Metals which may be used for fabrication of the monolith support are those capable of withstanding high temperature and the rigorous conditions which exist in a car exhaust system. Examples of such base metal alloys are nickel and chromium alloys having an aggregate Ni+Cr content greater than 20% by weight and alloys of iron including at least one of the elements chromium (3–40 wt.%), aluminium 1–10 wt.%, cobalt (trace-5 wt.%), nickel (trace-72 wt.%) and carbon (trace-0.5 wt.%). Additional trace elements which may be present in such alloys to improve their strength, and, for example, oxidation- and heat-resistance are:

|    | %   | W/W |
|----|-----|-----|
| Si | 0.2 | 0.9 |
| Mn | 0.2 | 0.7 |

| | % | W/W |
|---|---|---|
| Zr | 0.01 | 0.20 |
| Cu | 0.01 | 0.15 |
| Nb | 0.01 | 0.3 |
| Ta | 0.8 | 1.2 |
| Ti | 0.8 | 1.2 |
| Ce | 0.01 | 1.0 |
| Ca | 0.01 | 0.5 |

Other examples of suitable base metal alloys are the iron-aluminium-chromium alloys which also contain yttrium. These contain 0.5–12 wt.% Al, 0.1–3.0 wt.% Y, 0–20 wt.% Cr and balance Fe. These are described in U.S. Pat. No. 3,298,826. Another range of Fe-Cu-Al-Y alloys contain 0.5–4 wt.% Al, 0.5–3.0 wt.% Y, 20.0–95.0 wt.% Cr and balance Fe. These alloys are described in U.S. Pat. No. 3,027,252.

In this invention, a metallic substrate which has been mechanically deformed to produce an extended surface area possesses when compared with a plain non-deformed substrate, a very much increased exposed surface area for the same volume. Typically, the increased surface area may be achieved by corrugating or folding in a former and winding up a flat foil and a corrugated foil together into a tube having a spiral configuration in cross section.

In a preferred embodiment of the present invention, the metallic substrate which is employed as the monolith support for the catalyst is first crimped, corrugated, folded, indented and/or perforated in such a way that a very much more exposed surface area is produced. Such a surface area is normally much greater than that obtained with a ceramic honeycomb or with particulate catalyst supports for the same given volume. An example of a metallic substrate made in accordance with this invention comprises a roll of corrugated sheet of a heat resisting alloy interleaved with a non-corrugated sheet of such alloy. Alternatively, two corrugated sheets may be used with the corrugations in each sheet in parallel or transverse relationship to each other. A coiled substrate is then provided with a firmly adherent coating containing a refractory metal oxide which is porous and absorbent and has a high surface area and which acts as the carrier for the second catalytically active layer containing one or more of the catalytic intermetallic compounds as herein defined.

The heat resistant alloys comprising the extended metal substrate are alternatively alloys having a minimum nickel plus chromium content of 20% by weight. Typical alloys which therefore may be used for the extended metal substrate are high nickel and chromium stainless steels and proprietary products such as "INCONEL" (Registered Trade Mark) 600 and "INCONEL" 601.

Preferably, the metallic honeycomb structure has deposited thereon a first coating of a refractory metal oxide which is then further impregnated or coated with one or more of the intermetallic compounds specified above. Suitable refractory metal oxides comprising the said first coating are as previously described with reference to ceramic substrates.

We prefer to provide the metallic substrate with a first firmly adherent oxide layer in an essentially two stage process. In the first stage the metallic substrate is thermally oxidised to provide a thin first oxide layer which acts as a key. We prefer to carry out thermal oxidation by maintaining the formed metallic substrate at from 1000°–1200° C. in air or moist cracked ammonia vapour for 1 hour. The higher temperature is required with very oxidation resistant alloys such as the Kanthal range and the moist hydrogen atmosphere is preferred with alloys having a high Ni content.

The adherent oxygen containing or oxide film may be produced by any one of several known methods including chemical techniques. As with ceramic substrates, the film must be of sufficient thickness to provide adequate absorptive capacity for retaining the catalytically active intermetallic compound comprising one or more of the specified group VIII metals and the film is preferably from 0.0004 to 0.001 inches thick.

Where aluminium is present in the alloy forming the extended metal substrate the oxide film may be produced by treating the aluminium containing surface with a solution of an alkaline carbonate usually a sodium carbonate-chromate solution. The film may be produced by the anodic oxidation of the metal surface whereby the metal is made the anode in an electrolytic solution. In anodising aluminium containing surfaces, a 15% sulphuric acid solution is commonly employed as the electrolyte but other acid electrolytes such as chromic acid, oxalic acid, phosphoric acid and, sometimes, boric acid may be used. The oxide film is deliberately positioned and does not include the relatively thin natural oxide films which sometimes occur on metal surfaces which have been exposed to the atmosphere.

One method of forming an alumina layer on these alloys which do not contain sufficient aluminium to form their own alumina layer upon oxidation includes the use of Calorising (Registered Trade Mark). This involves the vapour deposition of an aluminium coating followed by anodising or heating in an oxygen-containing gas. Alternative coatings such as chromate, phosphate, silica or silicate or zirconia may all be deposited by known methods.

There are many different techniques for the preparation of a high surface area catalytically active refractory metal oxide wash coat containing one or more of the refractory metal oxides which confer beneficial properties as regards ageing and inertness to the deposited intermetallic compounds at high temperature under oxidising and reducing conditions.

A preferred adherent oxide coating deposited upon the extended metal substrate is alumina.

One method for the deposition of hydrous alumina is proposed in U.S. Pat. No. 2,406,420. Any convenient aluminium compound such as alkali metal aluminates and aluminium salts may be used as the starting material. Either acidic or basic precipitants are used, depending upon the character of the starting material. Suitable acidic precipitants are ammonium chloride, ammonium sulphate, ammonium nitrate, hydrochloric acid, nitric acid, etc. Suitable basic precipitants are ammonium hydroxide, sodium hydroxide, hexa-methylene tetramine, etc.

One method is to precipitate the hydrous alumina from an alkali metal aluminate solution containing excess aluminium and alkali metal hydroxide directly onto the extended metal substrates forming part of the present invention. If the aluminate solution is maintained at a temperature of 60°–85° C. a film or coating of alpha alumina trihydrate (Gibbsite) is deposited. Subsequent heating at 250°–180° C. converts the tri-hydrate to the monohydrate and further heating at 540° C. converts the monohydrate to gamma alumina without loss of the very high surface area coating which is produced by this method. The high surface area results from the formation of hexagonal crystal aggregates of approximate size 8×8×20 microns. Micropores of size of 40 Å diameter are present in the hexagonal crystal aggregates but appear to play no part in the catalytic activity of the structure.

We prefer a washcoat loading which is within the range of 5-30% by weight of the metallic monolith substrate. A suitable loading of $Al_2O_3$ on Kanthal D (Registered Trade Mark) having 400 cells per square inch is 10% by weight. The surface area of the alumina is 50-500 square meters per gram of alumina. The aluminate method deposition of alumina, described above, gives a surface area of from 120-160 square meters per gram of alumina.

An alternative method for the deposition of an adherent alumina washcoat on the metallic substrate is to prepare a slurry of a preactivated Gibbsite (alumina trihydrate) and an alumina monohydrate having a solid-liquid ratio of between 25 and 50% and a pH less than 7 and using this to impregnate the shaped substrate by complete immersion. The exact strength of the slurry used (which may be determined by trial and error) should be sufficient to produce an alumina washcoat of the required thickness. The substrate is then allowed to dry in warm air and finally fired for 2 hours at 450° C. to form chi and gamma alumina in adherent coating up to 0.002 in. thick on the metallic substrate. Crystal aggregates of diameter 3-7 microns are produced having micropores of approximately the same size, i.e., 40 Å, in diameter.

Another method of deposition of an adherent alumina washcoat on the metallic substrate is to use a slurry of alpha alumina monohydrate as described with reference to a ceramic substrate.

Further suitable proprietary alumina trihydrates are as described with reference to ceramic substrates and, as before, one or more of the oxides titania, zirconia, hafnia and thoria may be present in the alumina for the purpose of providing additional stabilisation of the intermediate oxide (washcoat) layer. Other rare earth oxides, alkaline earth oxides and alkali metal oxides may also be used.

Many of the aluminium-containing metallic substrates according to the present invention have the property of oxidising "inwards". That is to say we believe that a factor contributory to the success of the catalyst supported on a metal substrate is the fact that the extended metal substrate itself, which forms part of the catalytic structure has a tendency to oxidise under very strongly oxidising conditions in such a way that the first layer of adherent oxide film does not tend to grow over or cover the outermost layer of intermetallic compound.

The invention will now be described by way of example only with reference to some oxidation activity tests carried out on catalysts comprising the intermetallic compounds $NiAl_3$ and $Ni_{2.86}Pt_{0.14}Al$ deposited on alumina-washcoated ceramic substrates. The tests were carried out in apparatus in which the conditions in service in a car exhaust purification unit could be simulated.

The $Ni_3Al$ catalyst was prepared by the absorption of a solution containing appropriate relative quantities of nickel and aluminium chlorides in the washcoat of the honeycomb substrate followed first by drying and then by the heating of the substrate in a stream of pure $H_2$ at 750° C. for 2 hours to reduce the chlorides to the metals and to form the required intermetallic compound.

For the production of the $Ni_{2.86}Pt_{0.14}Al$ catalyst, the above process was repeated except that an appropriate proportion of the nickel chloride in the solution was replaced by CPA (chloroplatinic acid).

In the first case, the concentration of nickel chloride was such that sufficient nickel aluminide was formed to provide 300 grams of nickel as the aluminide per cubic foot of the finished catalyst. In the second case, sufficient chloroplatinic acid was used to give a platinum concentration of 40 grams of nickel as the aluminide per cubic foot of the finished catalyst. In the second case, sufficient chloroplatinic acid was used to give a platinum concentration of 40 grams of the metal as nickel platinum aluminide per cubic foot of the finished catalyst.

In all but one of the following tests, mixtures of water vapour, $O_2$, CO and NO which were intended to simulate exhaust gases were passed at a space velocity of 40,000 $hr^{-1}$ through catalyst units maintained at 450° C. to within 5° C. and, in each case, the gas mixture contained 2 volume % of CO and known proportions of $O_2$ and NO and an excess of water vapour. The percentage conversions of CO and NO achieved were determined by analysing the gas mixtures emerging from the catalyst units.

TEST NO. 1

The results of this test, which was conducted by passing gas mixtures containing varying amounts of $O_2$ and NO over a catalyst comprising $Ni_3Al$ on a washcoated ceramic honeycomb substrate are given in the following Table 1.

TABLE 1

| | | CO: 2 vol % | | |
|---|---|---|---|---|
| $O_2$ vol. % | NO ppm | NO measured conversion to $N_2$ % | CO measured conversion to $CO_2$ % | Max. possible conversion of CO to $CO_2$ by oxidation by the $O_2$ and NO present % |
| 0 | 1000 | 82 | 44.6 | 5 |
| 0.15 | 1350 | 66 | 44.6 | 21.75 |
| 0.3 | 1400 | 53.6 | 33.2 | 37 |
| 0.5 | 1350 | 37.9 | 33.2 | 56.75 |
| 0.7 | 1400 | 34.8 | 44.7 | 77 |
| 0.9 | 1400 | 35.7 | 58.2 | 97 |
| 1.2 | 1380 | 15.7 | 66 | 100 |
| 1.5 | 1380 | 7.2 | 67.5 | 100 |
| 1.7 | 1380 | 7 | 68.7 | 100 |

Initially, most of the CO was oxidised by the water gas shift reaction (equation 5) but as the proportions of NO and $O_2$ increased, there was a reduction in the effectiveness of the $Ni_3Al$ catalyst in promoting this reaction as is evidenced by the CO conversion figures in column 4. The $Ni_3Al$ catalyst, however, retains its ability to catalyse the reaction in the presence of NO and $O_2$ much better than does a nickel catalyst. This is a well known water gas shift catalyst but its capacity to catalyse the reaction is dramatically reduced in the presence of NO and $O_2$.

The figures in column 5 in this and other tables in this specification were calculated using equations 1 and 2 above.

Test 1 was repeated after "soaking" the $Ni_3Al$ catalyst at 450° C. in NO for 45 minutes and the results were essentially the same as those obtained in the first test and set forth in Table 1. This demonstrates the resistance to poisoning by NO of the $Ni_3Al$ catalyst used for the tests.

TEST NO.2

A further sample of the $Ni_3Al$ catalyst used for Test No.1 was prepared and the test repeated. The following results were obtained:

TABLE 2

| | | CO: 2 vol % | | |
|---|---|---|---|---|
| $O_2$ vol. % | NO ppm | NO measured conversion to $N_2$ % | CO measured conversion to $CO_2$ % | Max. possible conversion of CO to $CO_2$ by oxidation by the $O_2$ and NO present % |
| 0 | 0 | 0 | 62.4 | 0 |
| 0 | 1000 | 97 | 11.4 | 5 |
| 0.1 | 2000 | 35 | 9.7 | 20 |
| 0.25 | 1950 | 23 | 9.9 | 34.75 |
| 0.4 | 1900 | 16 | 10.1 | 59 |
| 0.6 | 1900 | 16 | 14.9 | 69.5 |
| 0.75 | 1800 | 9 | 14.4 | 84 |
| 0.9 | 1800 | 9 | 18.2 | 99 |
| 1.2 | 1800 | 9 | 21.7 | 100 |
| 0 | 0 | 0 | 73.4 | 0 |

Again there is evidence in column 4 of a reduction in water gas shift activity in the presence of NO and $O_2$. The catalyst, however, demonstrated considerable residual activity and upon the removal of the NO and $O_2$ returned to a level of activity which was, at least, as high as at the beginning of the test.

TEST NO.3

For this test the procedure of test No.1 was gone through once more but this time using a catalyst comprising $Ni_{2.86}Pt_{0.14}Al$ on a wash-coated ceramic honeycomb substrate. The results were as follows:

TABLE 3

| | | CO: 2 vol % | | |
|---|---|---|---|---|
| $O_2$ vol. % | NO ppm | NO measured conversion to $N_2$ % | CO measured conversion to $CO_2$ % | Max. possible conversion of CO to $CO_2$ by oxidation by the $O_2$ and NO present % |
| 0 | 1000 | 100 | 60.5 | 5 |
| 0.13 | 1000 | 93.5 | 69.5 | 18 |
| 0.31 | 1000 | 93 | 72 | 36 |
| 0.40 | 1000 | 94.5 | 78.5 | 45 |
| 0.58 | 1000 | 96 | 84 | 63 |
| 0.75 | 1000 | 97 | 90.5 | 80 |
| 0.93 | 1000 | 97.5 | 97 | 98 |
| 1.09 | 1000 | 91 | — | 100 |
| 1.12 | 1000 | 37 | — | 100 |
| 1.13 | 1000 | 12 | 100 | 100 |

With this catalyst, NO appeared to have only a slight effect on CO conversion since, with the exception of only two measurements, the conversion figures were higher than the maximum values in column 5 calculated on the basis of the oxidation of CO to $CO_2$ by $O_2$ and NO. The two exceptions, with the respective maximum values in brackets, were 97% (98%) and 100% (100%).

This indicates that the CO conversion reactions 1 and 2 and also the water gas shift reaction were being simultaneously catalysed.

The catalyst used for this test is accordingly especially well adapted to achieve the objects of the invention. It would cause a significant shift of lines 2 and 3 in FIG. 1 to the left (towards "rich" values of λ) since experience has shown that catalysts which will catalyse the oxidation of CO are also effective in catalysing the oxidation of hydrocarbons. In addition, as will be seen from Table 3, significant NO reduction occurred with this catalyst.

TEST NO.4

A further test was carried out with a sample of the $Ni_{2.86}Pt_{0.14}Al$ catalyst used for test No.3 to determine CO conversion as a function of the oxygen content of the gas mixtures passed through the catalyst. In this case, the gas mixture contained an excess of water vapour, 2 volume % of CO and varying amounts of $O_2$ and the results are given in table 4 below. Here the figures in column 3 are calculated on the basis of the oxidation reaction of equation 1.

TABLE 4

| | CO: 2 vol % | |
|---|---|---|
| $O_2$ % | CO measured conversion to $CO_2$ % | Maximum possible conversion of CO to $CO_2$ by oxidation by the $O_2$ present % |
| 0 | 74.5 | 0 |
| 0.13 | 76 | 13 |
| 0.25 | 79.5 | 25 |
| 0.43 | 83 | 43 |
| 0.55 | 87 | 55 |
| 0.79 | 94 | 79 |
| 1.10 | 100 | 100 |

The high water gas shift activity in the present case with zero $O_2$ is noteworthy. With this catalyst significant oxidation of CO by the $O_2$ present occurs together with a significant simultaneous contribution to the total CO conversion to $CO_2$ from the water gas shift reaction.

Although the catalyst of this invention has, in the foregoing been described with reference to the purification of motor car exhaust gases it is by no means so limited. It may be used for example in many other applications in which its capacity to promote oxidation and reduction reactions under appropriate conditions may be utilised. A reaction often used in industry for which a catalyst according to this invention may be used with effect is the so-called "hydrocarbon steam reforming reaction". This is exemplified in equation 6 and is conventionally catalysed by means of a Ni and alumina catalyst.

We claim:

1. A three-way catalyst comprising a substrate having supported thereon at least one intermetallic nickel compound of the general formula $A_xB_y$ where A represents nickel alone or nickel with another Group VIII metal having an atomic number not larger than 78; B represents one or more metals of the group consisting of Al, Sc, Y, the lanthanides, Ti, Zr, Hf, V, Nb and Ta and x and y are integers and a layer of at least one refractory metal oxide disposed between the substrate and the intermetallic compound.

2. A catalyst according to claim 1 wherein the substrate is made from a metallic or ceramic material.

3. A catalyst according to claim 1 wherein the substrate is in particulate or monolithic form.

4. A catalyst according to claim 3 wherein the particulate support is made from a material selected from the group consisting of silica, charcoal, alpha alumina, gamma alumina, alumino-silicate, magnesia, diatomaceous earth, bauxite, titania, zirconia, limestone, magnesium silicate, silicon carbide, activated and inactivated carbons.

5. A catalyst according to claim 1 wherein the refractory metal oxide layer is selected from the group consisting of one or more of the oxides of B, Al, Si, Be, Mg, Ca, Sr, Ba, Sc, Y, Ti, Zr, Hf, the lanthanides and the actinides.

6. A catalyst according to claim 1 wherein the refractory metal oxide layer is selected from the group consisting of gamma and activated alumina.

7. A catalyst according to claim 6 wherein the refractory metal oxide layer has a thickness falling within the range of 0.0004 to 0.002 inch.

8. A catalyst according to claim 1 wherein the refractory metal oxide layer also contains at least one oxide selected from the oxides titania, zirconia, hafnia and thoria, alkaline earth oxides and alkali metal oxides.

9. A catalyst according to claim 2 wherein the substrate comprises a plurality of metallic foils formed and assembled to produce a multiplicity of channels extending therethrough.

10. A catalyst according to claim 9 wherein the foils are made from nickel/chromium alloys having a nickel plus chromium aggregate content greater than 20 wt %.

11. A catalyst according to claim 9 wherein the foils are made from alloys of iron containing at least one of the metals chromium (3 to 40) wt %, aluminium (1–10)wt %, cobalt (trace to 5)wt.%, nickel (trace to 72) wt % and carbon (trace to 0.5 wt %).

12. A catalyst according to claim 11 including at least one of the following additional elements in the amount specified:

|    | %    | W/W  |
|----|------|------|
| Si | 0.2  | 0.9  |
| Mn | 0.2  | 0.7  |
| Zr | 0.01 | 0.20 |
| Cu | 0.01 | 0.15 |
| Nb | 0.01 | 0.3  |
| Ta | 0.8  | 1.2  |
| Ti | 0.8  | 1.2  |
| Ce | 0.01 | 1.0  |
| Ca | 0.01 | 0.5  |

13. A catalyst according to claim 9 wherein the foils are made from an alloy consisting of, apart from impurities, 0.5–12 wt % aluminium, 0.1–3.0 wt % Y, 0–20 wt % Cr and balance iron.

14. A catalyst according to claim 1 wherein the intermetallic compound is selected from the group consisting of $Ni_3Al$, and $Ni_{2.86}Pt_{0.14}Al$.

* * * * *